United States Patent
Thomas et al.

(10) Patent No.: US 10,262,143 B2
(45) Date of Patent: Apr. 16, 2019

(54) SYSTEM AND METHOD FOR MODELING AND ANALYZING THE IMPACT OF CYBER-SECURITY EVENTS ON CYBER-PHYSICAL SYSTEMS

(71) Applicant: The MITRE Corporation, McLean, VA (US)

(72) Inventors: Roshan K. Thomas, Fairfax Station, VA (US); Mary C. Hatfield, Centreville, VA (US); Ivan Lozano, Arlington, VA (US); Edward Overly, Oak Hill, VA (US); Joel G. Korb, Reston, VA (US); Jimmy Vu, Fairfax, VA (US)

(73) Assignee: The MITRE Corporation, McLean, VA (US)

( * ) Notice: Subject to any disclaimer, the term of this patent is extended or adjusted under 35 U.S.C. 154(b) by 171 days.

(21) Appl. No.: 15/264,028

(22) Filed: Sep. 13, 2016

(65) Prior Publication Data
US 2018/0075243 A1 Mar. 15, 2018

(51) Int. Cl.
| G06F 11/00 | (2006.01) |
| G06F 21/57 | (2013.01) |
| G06F 17/50 | (2006.01) |

(52) U.S. Cl.
CPC ........ G06F 21/577 (2013.01); G06F 17/5009 (2013.01)

(58) Field of Classification Search
None
See application file for complete search history.

(56) References Cited

U.S. PATENT DOCUMENTS 8,374,840 B2  2/2013 Sankaranarayanan et al.
8,407,798 B1  3/2013 Lotem et al.
(Continued)

FOREIGN PATENT DOCUMENTS

| CN | 103699743 | 4/2014 |
| CN | 103699762 | 9/2016 |

(Continued)

OTHER PUBLICATIONS

Lin, Jing et al. "Modeling Cyber-Physical Systems with Semantic Agents," Computer Software and Applications Conference Workshops (COMPSACW), IEEE 34th Annual, Jul. 2010; 6 pages.
(Continued)

Primary Examiner — Samson B Lemma
(74) Attorney, Agent, or Firm — Morrison & Foerster LLP

(57) ABSTRACT

A system and method for systematically undertaking model-based security analysis of a cyber physical system (CPS) is provided. In one example, a cyber model simulation and a control system simulation are mapped using various methods to determine which portions of the cyber-model simulation and the control system simulation are correlated with one another. Using the determined correlation, when a cyber-attack is generated on the cyber model simulation, a corresponding attack hook can be generated for the control system model. The attack hook is configured to be integrated into the control system model so as to mimic the effect on the control system that a cyber-attack can engender. Once one or more attack hooks are generated, the user can place the hooks into the control system simulation schemas and run a series of simulations to determine the effects of a cyber event on the control system in a CPS.

40 Claims, 8 Drawing Sheets

(56) References Cited

U.S. PATENT DOCUMENTS

| | | |
|---|---|---|
| 8,595,831 B2 | 11/2013 | Skare |
| 8,707,431 B2 | 4/2014 | Stephens et al. |
| 8,781,798 B2 | 7/2014 | Nambiar et al. |
| 9,092,631 B2 | 7/2015 | Muller et al. |
| 9,106,413 B2 | 8/2015 | Kim et al. |
| 2003/0182582 A1 | 9/2003 | Park et al. |
| 2010/0299651 A1 | 11/2010 | Fainekos et al. |
| 2010/0332209 A1* | 12/2010 | Casteres ............ G06F 17/5009 703/21 |
| 2012/0317589 A1* | 12/2012 | Foti ..................... G06F 8/315 719/320 |
| 2013/0198847 A1 | 8/2013 | Sampigethaya |
| 2013/0347060 A1 | 12/2013 | Hazzani |
| 2013/0347116 A1 | 12/2013 | Flores et al. |
| 2014/0019104 A1 | 1/2014 | Martinez Canedo et al. |
| 2014/0189860 A1 | 7/2014 | Hull Roskos |
| 2014/0283047 A1 | 9/2014 | Dixit et al. |
| 2015/0096026 A1 | 4/2015 | Kolacinski et al. |
| 2015/0381649 A1* | 12/2015 | Schultz .............. H04L 63/1433 726/25 |
| 2016/0285907 A1* | 9/2016 | Nguyen ............. H04L 63/1433 |

FOREIGN PATENT DOCUMENTS

| | | |
|---|---|---|
| WO | WO 2014/078848 | 5/2014 |
| WO | WO 2014/109645 | 7/2014 |
| WO | WO 2015/102717 | 7/2015 |

OTHER PUBLICATIONS

Sridhar, Siddharth et al. "Cyber-Physical System Security for the Electric Power Grid," Proceedings of the IEEE, vol. 100, No. 1, Jan. 2012; 15 pages.

\* cited by examiner

SYSTEM AND METHOD FOR MODELING AND ANALYZING THE IMPACT OF CYBER-SECURITY EVENTS ON CYBER-PHYSICAL SYSTEMS

STATEMENT REGARDING FEDERALLY SPONSORED RESEACH OR DEVELOPMENT

This invention was made with Government support under U.S. Government contract W56KGU-14-C-0010 awarded by the U.S. Department of the Army. The Government has certain rights in this invention.

FIELD OF THE INVENTION

The present disclosure relates to the security vulnerability analysis and design testing of control systems for their readiness, robustness, and performance against cyberattacks. More specifically, the present disclosure relates to systems and methods for modeling the impact of cyber-security events on cyber-physical systems (CPS) to determine potential flaws in the design of a physical system and its underlying control system.

BACKGROUND OF THE INVENTION

Modern computing advances in which processor speeds have increased and computers are able to connect with other computers with increasing speed and efficiency have enabled what was once a purely physical system that was operated by electro-mechanical controls to now be operated by wired digital controls. As an example, conventionally, a power plant was operated by a human operator on-site, but, in the advent of modern computing advances, a physical power plant can be controlled by an operator using a digital control system as an intermediary. The use of computerized and digital controls can make the physical system vulnerable to cyberattacks in which a hacker or otherwise unauthorized user can manipulate the cyber-physical system in undesired ways.

Cyberattacks on cyber-physical systems (CPS) have been on the increase over the last few years. Attacks on water treatment plants, steel plants, gas pipeline pumping stations, automobiles, etc., have now been reported in the literature. A CPS system is one where computing, communications, and control come together to manage the physical operations of a system. Increased dependency on cyber-physical systems has amplified concerns of cyberattacks on these systems.

Attacks on CPS are, at their very core, attacks on control systems. A control system can include sensors, control algorithms, and actuators, and their implementation in computerized form, through the use of appropriate electronics and software found in programmable logic controllers (PLCs) and execution control units (ECUs).

To better understand the impact of cyberattacks upon CPS, it can be useful to simulate and analyze the effects of cyberattacks on CPS. Specifically, it can be useful to map the effects of a cyber-attack to the effects it can have on the control systems and physical components of a CPS so as to obtain a robust understanding of the consequences that cyberattacks can engender upon a CPS.

SUMMARY OF THE INVENTION

Accordingly, a system and method for modeling, simulating, and analyzing a CPS and the impacts that a cyber-attack can have upon it is provided. The system in essence, is a model-based security diagnosis, analysis system. The system and method can include a frontend web-based workbench-style interface that allows analysts to create and manage various cyber-attack effects libraries, import cyber and simulation (control) models, launch a number of cyber attack effects on the simulation models, and observe their impacts. Specifically, the backend simulation platform can utilize the cyberattack model to generate one or more attack hooks that can be integrated into the simulation model to emulate the impact that a particular cyberattack can have upon the physical operation of the CPS. Multiple simulations can then be run with the attack hooks in place to analyze the overall impact to CPS performance due to a cyberattack under a variety of attack conditions.

DETAILED DESCRIPTION OF THE INVENTION

Figure 1:
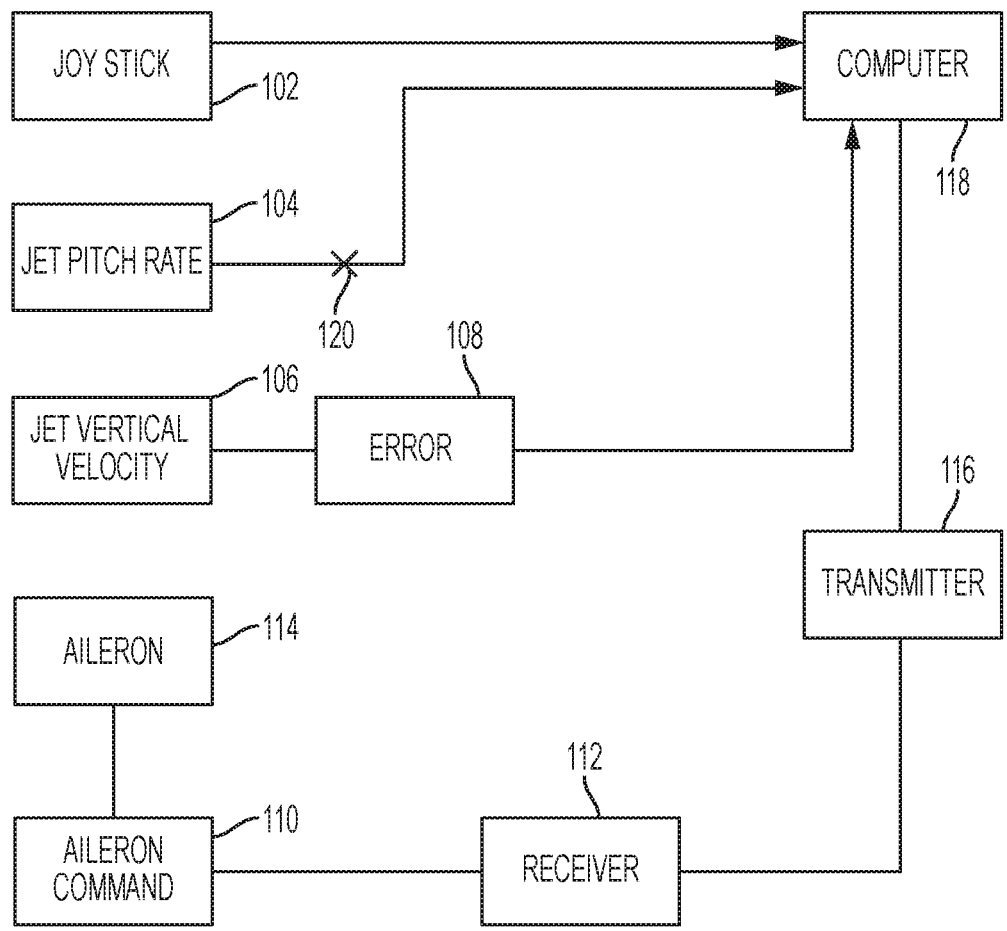
FIG. 1 illustrates an exemplary cyber simulation model of a cyber-physical system according to examples of the disclosure.

Cyber-physical systems, as described above, can refer to systems that include physical entities and mechanisms that are controlled and monitored by computer-based processes. In order to understand vulnerabilities of a CPS, it can often be helpful to model the CPS so as to model failure/vulnerability pathways that could potentially exist within the system. Often a CPS can be complex and include many various components. Modeling the system can provide a convenient way to quickly determine and examine various failure/vulnerability pathways. For instance, modeling paradigms and tools such as the Architecture Analysis & Design Language (AADL) can be used to model various aspects of a CPS. In particular, AADL is used to capture the software and hardware architecture of the embedded real-time systems. Going forward, this is referred to as the System Design Model (SDM) of any target application. Support for such architecture modeling has the advantage that the models can be used for design documentation, for analyses (such as schedulability and flow control) as well as automated code generation. For those skilled in the art, use of AADL and other modeling paradigms are an integral part of the field of "model-based design". Although, AADL is an example of a type of tool (i.e. modeling approach/paradigm) that can be used to model a CPS, this disclosure should not be construed as limited, and other tools similar to AADL (such as SysML) could also be used to model a CPS and the invention described herein will provide equivalent utility.

In the following description of the disclosure and embodiments, reference is made to the accompanying drawings in which are shown, by way of illustration, specific embodiments that can be practiced. It is to be understood that other embodiments and examples can be practiced, and changes can be made without departing from the scope of the disclosure.

In addition, it is also to be understood that the singular forms "a," "an," and "the" used in the following description are intended to include the plural forms as well, unless the context clearly indicates otherwise. It is also to be understood that the term "and/or" as used herein refers to and encompasses any and all possible combinations of one or more of the associated listed items. It is further to be understood that the terms "includes", "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "computing," "calculating," "determining," "displaying," or the like refer to the action and processes of a computer system, or similar electronic computing device, that manipulates and transforms data represented as physical (electronic) quantities within the computer system memories or registers or other such information storage, transmission, or display devices.

Certain aspects of the present invention include process steps and instructions described herein in the form of an algorithm. It should be noted that the process steps and instructions of the present invention could be embodied in software, firmware, or hardware, and when embodied in software, could be downloaded to reside on and be operated from different platforms used by a variety of operating systems.

AADL can be used to specify and analyze real-time embedded systems and map software onto computational hardware elements. FIG. 1 illustrates an exemplary cyber simulation model of a cyber-physical system according to examples of the disclosure. The cyber simulation model shown in FIG. 1 can be represented as an AADL schema that is part of the SDM. It is a "cyber" simulation model in that the model is a rendition of the application schema in terms of the software and hardware architecture, i.e. the cyber dimension. This should be distinguished from the "control" simulation model that is expressed in terms of control and physical system modeling as found in modeling and simulation tools such as Matlab and Simulink. The model can include one or more cyber simulation modules that are specified by a designer of the model to represent various aspects of the fighter jet. The example of FIG. 1 illustrates an AADL model of an F14-Tomcat fighter jet. Specifically, AADL model 100 illustrates the software and hardware architecture of a portion of the fighter jet's aileron control system.

The model 100 can include a joystick model 102 that can represent the controls a pilot would engage to control the aircraft and, specifically, the controls of the aileron. The joystick model 102, as implemented in AADL, can model the signals that are generated when a pilot applies a particular control or movement to the joystick. As illustrated in FIG. 1, the output of the joystick model 102 can be transmitted to a computer model 118. Computer model 118 can take in multiple inputs in addition to the input from the joystick module model 102 as specified above. As illustrated in FIG. 1, the computer model 118 can also receive signals from jet pitch rate sensor model 104, as well as jet vertical velocity sensor model 106, via error calculator model 108. Jet pitch rate sensor model 104 can represent the signals generated by a sensor that reads the pitch rate of the fighter jet and then generates signals that are then transmitted to the computer represented in the model 100 as computer model 118. The jet vertical velocity sensor model 106 can represent the signals generated by a sensor that reads the vertical velocity (i.e., rate of ascent and decent) of the fighter jet and then generates signals that are then transmitted to the computer represented in the model 100 as computer model 118. In the AADL model illustrated in FIG. 1, the signals generated by the jet vertical velocity sensor model 106 can be passed through an error calculator module model 108 that can add random error signals to the jet vertical velocity signals in order to simulate a noisy environment.

Computer model 118 can input the signals described above and then generate signals to maneuver the ailerons of the aircraft in a specific way based on the pilot's controls and the pitch rate and vertical velocity of the aircraft. In order to effectuate movement of the aileron, computer model 118 can model a command sent to the aileron at its output. The command can be received by a transmitter model 116 which in turn can modulate the received signal and transmit it to a receiver model 112. The received signal at receiver model 112 can then transmit the signal to an aileron command model 110, which, upon deciphering the received command, can issue a signal to aileron model 114 to move according to the commands generated by computer model 118.

The AADL model presented in FIG. 1 can be used to represent the signals and communications generated in the system that controls the aircraft's aileron and can be used to model the effect of irregularities caused by system attacks from a malicious third-party user or from internal failures of the individual components of the system. As an example, the model 100 of FIG. 1 can be used to model the effect of a cyberattack on the jet pitch rate sensor. In an example scenario, a cyber attacker could gain access to the sensor and effectively shut it down or manipulate the results generated by the sensor. In FIG. 1, a hack of the jet pitch rate sensor 104 can be modeled as a cessation of transmission of the signal sent to the computer 118 as shown at 120.

The AADL model 100 illustrated in FIG. 1, while being able to model the cyber implications of an attack (such as the hack of the jet pitch rate sensor 104 discussed above) can be limited in modeling a potential cyberattack. For instance, the model 100 may not be capable of modeling the physical implications of a cyberattack on the jet fighter. For instance, if the jet pitch rate sensor 104 is hacked such that the signal transmitted is interrupted or terminated as depicted at 120 of FIG. 1, the model 100 may not provide information as to the implications on the physical flight of the fighter jet or how the avionic control systems may react to the termination of the jet pitch rate sensor 104 signal.

Figure 2:
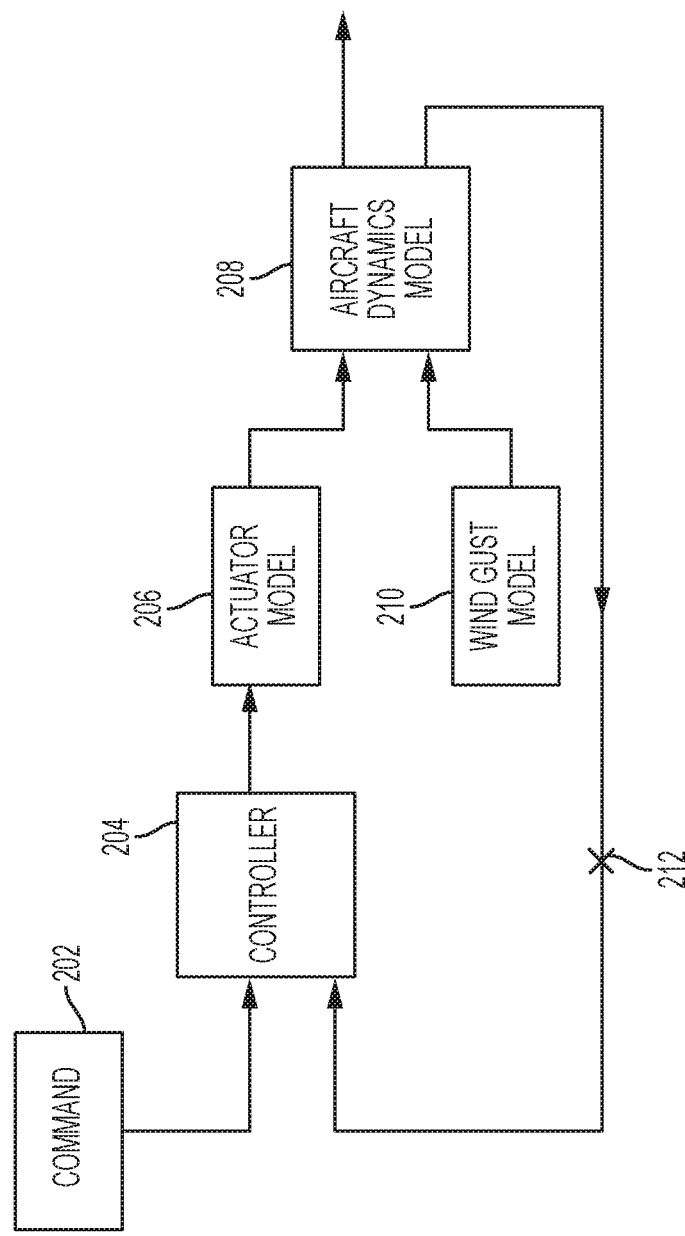
FIG. 2 illustrates an exemplary model of a physical control system of a cyber-physical system according to examples of the disclosure.

Control system simulations can model the physical behavior of a CPS. A control system simulation can model the physical effects upon a CPS due to certain changes in how the CPS is operated. Using a jet fighter model as an example, a control system simulation can model how the loss or modification of aileron control can affect the physical flight of the jet fighter. FIG. 2 illustrates an exemplary model of a control system of a cyber-physical system, according to examples of the disclosure.

The model can include a command model 202 that models commands given by a pilot to control the ailerons of an aircraft. Commands generated from the command model 202 can be sent to the controller 204. The controller 204 can receive commands from the command model 202, as well as real-time data from the aircraft dynamics model 208 (discussed below) to determine how to adjust the aileron actuator 206 to generate the flight control desired by the pilot through his commands modeled by command model 202. The model 200 can also include a wind gust model 210 that can model wind gusts that may be experienced by the jet. The wind gust model 202 can be modelled using a combination of empirical wind gust data and random stochastic noise associated with variations in wind gusts that may be experienced by a jet fighter.

The aircraft dynamics model 208 can take as its input the wind gust model 210 output and the actuator model 206 output. Each input can provide information to the aircraft dynamics model 208, and, using that information, the aircraft dynamics model 208 can determine the corresponding effect on the motion of the aircraft. In this way, based on a pilot's control of the aircraft and the wind gusts being experienced by the aircraft, the resultant motion of the aircraft can be modeled by the aircraft dynamics model 208.

The output of the aircraft dynamics model 208 can be fed back to the controller 204. The feedback loop can simulate the sensors that the aircraft uses to determine aileron control. Referring back to FIG. 1, jet pitch rate sensor 104 can provide a signal to computer 118 that can determine aileron control. In the CPS model of FIG. 2, that sensor feedback can be modeled by the feedback loop of the output of the aircraft dynamics model 208 to the controller 204. The controller 204 can use the commands generated by the pilot from command model 202, and the input provided by the aircraft dynamics model 208, to determine how to adjust the actuator model 206 so as to move the aircraft in the manner requested by the pilot.

The model 200 described above can be used to simulate the physical effects that a modification of the CPS can engender. As an example, if the feedback loop from the aircraft dynamics model 208 to the controller 204 is cut or interrupted, the model 200 can simulate the effects on the aircraft dynamics via aircraft dynamics model 208.

As described above, the cyber simulation model 100 of the CPS can model the effect of a cyberattack on the cyber systems of a CPS but may be limited in the information it can provide with respect to the physical implications of a cyberattack. Thus for example, while the model 100 can model the cyber effect of a cyberattack, such as the interruption of the jet pitch rate sensor signal 104 as indicated by the "X" 120, the physical effect of the attack may not be apparent. The model 200 can provide such information. The loss of jet pitch rate sensor 104 can be modeled as an interruption of the feedback loop between the aircraft dynamics model 208 and the controller 204 as indicated in FIG. 2 by the "X" at 212. Thus, by recognizing that an interruption of the jet pitch rate sensor 104 signal can correspond to an interruption of the feedback loop in model 200, the full effect of a cyberattack upon a CPS can be determined.

However, cyber-physical systems are often complex, and, often, such recognition of the correlation between the cyber-simulation model and the physical models of a system are not apparent or easily identifiable. In some examples, a cyber and a physical model may contain hundreds or thousands of nodes, and thus the process of manually identifying a correlation between the models can prove to be difficult. Thus, when a cyberattack is modeled, it may be difficult for a user to manually translate the results of a cyber simulation into a corresponding effect on the physical simulation model. Furthermore, modeling tools such as AADL and Simulink can operate in different domains. For instance, AADL simulations analyze a CPS from the perspective of the processes and signals being generated by the processors in the system. Simulink simulations analyze a CPS from the perspective of the signals being generated by the various blocks that represent components in the simulation model of the control system.

Figure 3:
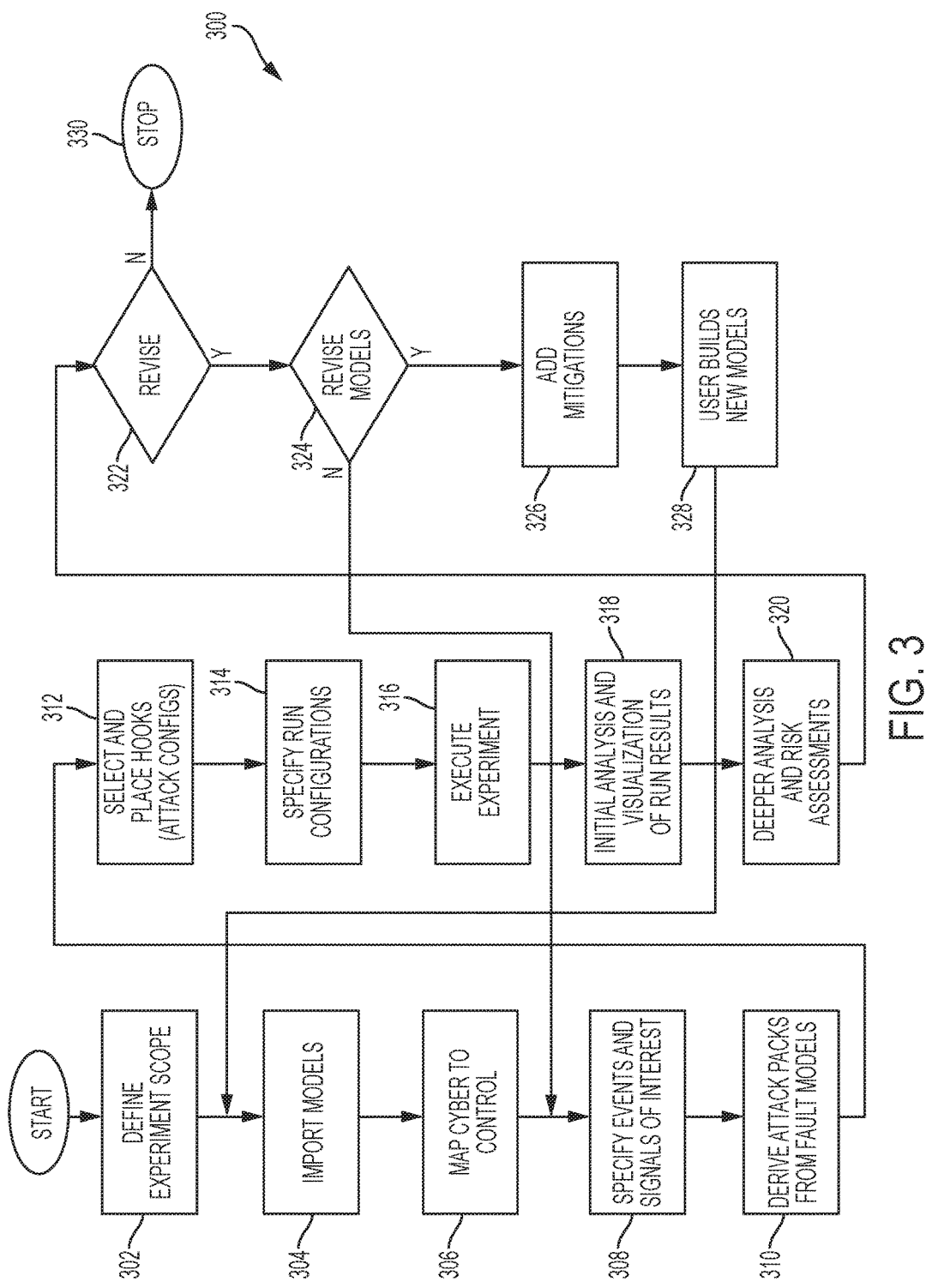
FIG. 3 illustrates an exemplary method of simulating cyber physical systems according to examples of the disclosure.

FIG. 3 illustrates an exemplary method of simulating cyber physical systems according to examples of the disclosure. The method 300 can be used to perform a simulation on a CPS by automatically employing both a cyber simulation model such as AADL, and a physical control system simulation, such as Simulink, to generate an analysis.

At step 302, the scope of the experiment can be defined by an analyst (user) of the simulation. The scope of the experiment can include a high-level abstract specification of the experiment that the user wishes to conduct using the simulations described above. The breadth and the depth of the experiment and related analysis can vary. Using the jet fighter example discussed above, at a high level the user may define the scope of the experiment as determining if the control system of the jet fighter can be hacked so as to cause a crash. The above question can employ both simulation models to make such a determination. The AADL model can be used to determine hackable processes in relation to the hardware and software architecture in the CPS, and the Simulink system may be employed to determine the physical ramifications of the hacking of a portion of the control system. The scope of the experiment can be broadly defined at step 302. As an example, the user of the simulation can simply define the scope of the experiment as determining everything that could go wrong with a particular control system, or scope the experiment narrower to a particular portion of a CPS, etc.

Once the scope of the experiment has been defined, the method can move to step 304 wherein the individual simulation models are imported. Using the example above, at step 304, the AADL and Simulink models can be imported by the computing system. The method 300 can assume that the AADL models and the Simulink models already exist, or in some example the models can be created and loaded into the system. In another example, the models may already exist within the system and thus do not need to be loaded into the system. Conventionally, AADL models and Simulink models have already been produced during the design stage of a CPS.

As discussed above, the two types of simulation models that are imported are cyber simulations (i.e., AADL) and control simulations (i.e., Simulink). After being imported into the computing system at step 304, the process can move to step 306 wherein the cyber simulation is mapped to the control simulation. Mapping the cyber simulation to the control simulation can include determining a correlation between the two simulations, so that a user of the simulation can determine how phenomena observed in the cyber simulation maps to the control simulation.

Figure 4:
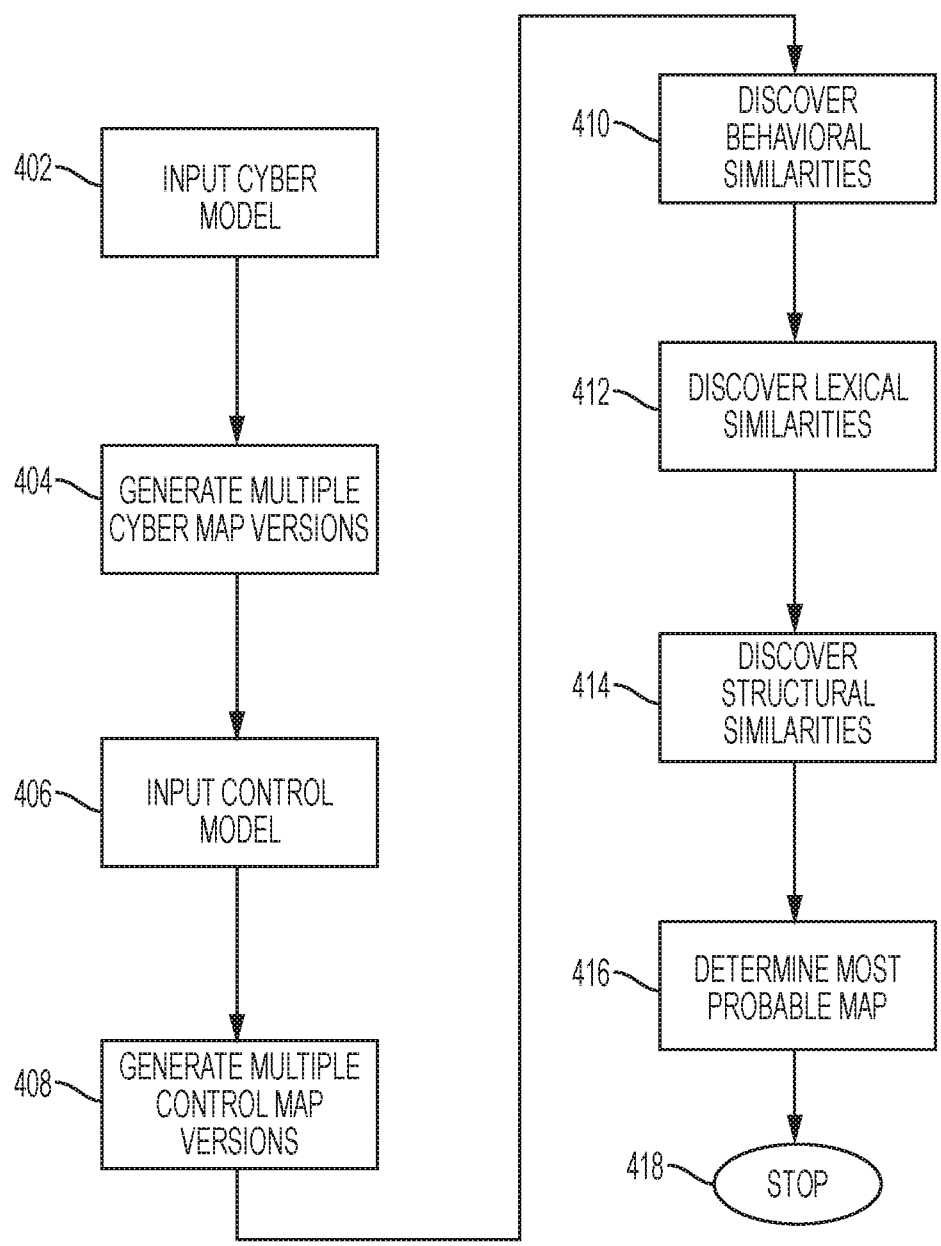
FIG. 4 illustrates an exemplary cyber simulation to control simulation mapping method according to examples of the disclosure.

FIG. 4 illustrates an exemplary cyber simulation to control simulation mapping method according to examples of the disclosure. At step 402, the cyber simulation model is inputted for the purposes of analysis. At step 404, the inputted cyber simulation model is analyzed so as to generate multiple cyber map versions. Using the AADL model discussed with respect to FIG. 1 as an example, the cyber simulation model can be analyzed and decomposed and recomposed into different layers of abstraction. As an example, the computer 118 can be analyzed at step 404 to determine if it can be broken down into various subcomponents, such as individual controllers or processors. If so, then the method can decompose the AADL simulation such that computer 118 is specified by its individual components rather than as a single block. The newly decomposed version of the AADL model can then be labeled as a separate version of the original AADL model.

Another version of the AADL model can be created by breaking down other AADL blocks into their respective components in the same manner as described above. The process discussed above at step 404 can be repeated multiple times at different levels of abstraction and wherein different combinations of blocks are decomposed in order to generate new versions of the cyber simulation model. At step 406, the control system model (i.e., Simulink model) is inputted. At step 406, the control system model is analyzed and new versions are generated in substantially the same manner as the cyber simulation model with respect to step 404.

At step 408, multiple versions of the cyber simulation model have been generated as well as multiple versions of the control system model, each version expressing the simulation model at a different level of abstraction for various components included in the model. The next steps in the method 410, 412, 414 can be executed to determine which versions of the cyber simulation models are most similar to the versions of the control system model.

At step 410, each version of the cyber simulation models can be compared against each version of the control system models to discover behavioral similarities. Searching for behavioral similarities can include comparing the overall function of a simulation block, such as sent and received data, the way in which the blocks distort, randomize, or otherwise manipulate the data being sent through a component, and can also include comparing the way in which various inputs of a block effect the outputs of blocks. As an example, if a particular component has two inputs and two outputs labeled as in1, in2, out1, and out2 respectively an example behavior that could be noted is that in1 feeds out1 and out2, while in2 is captured by the component and stored without having any direct effect on out1 or out2. The simulation can make note of this behavior in the cyber simulation model and can determine if there are any components within the control system model that exhibit the same type of behavior. In this way, by comparing behavioral similarities, the simulation can correlate components in the cyber simulation model with components in the control system model.

At step 412, the versions of the control system model and the cyber simulation model can be compared to determine any lexical similarities. Lexical similarities can refer to determining if there is any correlation between the names of the blocks in the cyber simulation model to the names of the blocks in the control system model. A particular block in the cyber simulation model can be identified, and a lexical search can be conducted with the various versions of the control system model to determine individual blocks that are similarly named. In this way, lexical similarities can be used as a metric to determine if a particular component in a cyber simulation model maps or is correlated to a particular block in the control system model.

At step 414, the components of the individual versions of the cyber simulation model and the control system model can be compared to determine if there are any structural similarities. Structural similarities can refer to determining if the structure of a particular component, for example the input and output ports, the distance of the component to its neighbor, the length of feedback loops, etc., are similar to a counterpart component in the control system model. If two blocks, one from the cyber simulation model and one from the control system model, exhibit structural similarities, then there may be an increased likelihood that the components correspond to one another. In substantially the same manner as described above, components in one version of the cyber simulation model can be compared to the components of the various control system models to determine if any of the components are structurally similar.

Once the components of the various cyber simulation model versions have been behaviorally, lexically, and structurally compared against the components of the various control system models, at step 416 the results of those comparisons can be used to determine the most probable mapping between versions of the cyber simulation model and the control system model. Using the noted similarities, each version of the cyber control system model can be paired with a version of the control system model. The pairing can be based on the components of each version and how closely they are correlated behaviorally, structurally, and lexically to one another. Once the versions are paired together, the components within the paired cyber simulation model and control system model can be mapped to one another, again using the results of the behavioral, structural, and lexical comparisons.

Returning to FIG. 3, once the cyber simulation model has been mapped to the corresponding control system model at step 306, the process can move to step 308 wherein a user such as an analyst or experimenter can specify the events and signals of interest. As an example, if the domain is that of airplane control systems, an event of interest (EOI) can be along the lines of a "stall" or "loss of total thrust". The user can request notification of when the simulation shows that the jet fighter has crashed, or the user can specify that it wishes to monitor the output of the aircrafts dynamic model 208. In this step, the user can essentially dictate what results of the simulation he/she wishes to visualize or see after the experiment is executed at step 316.

Figure 5:
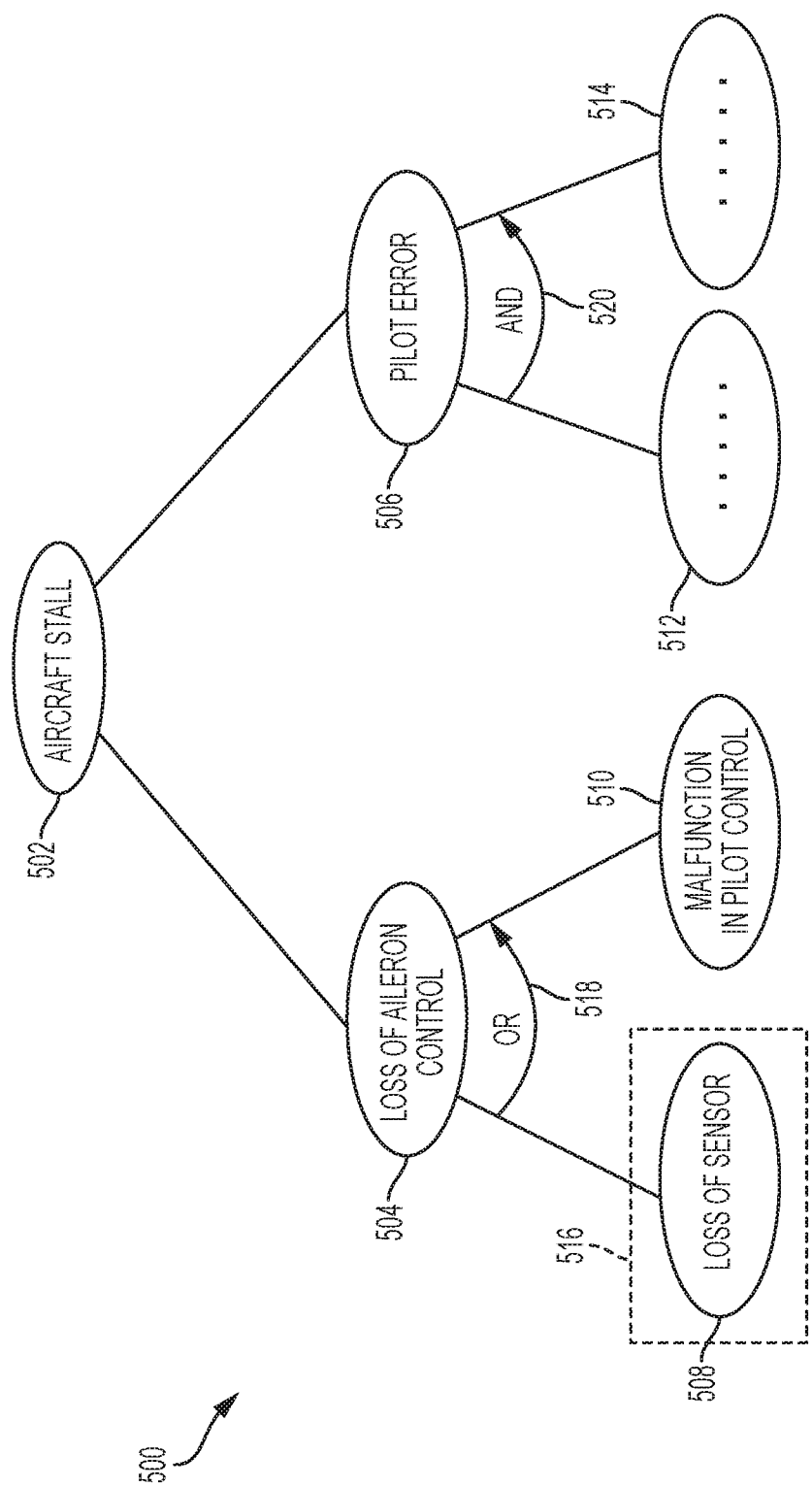
FIG. 5 illustrates an exemplary fault model according to examples of the disclosure.

FIG. 5 illustrates an exemplary fault model according to examples of the disclosure. The fault model 500 can be expressed as a tree, with the observed anomaly or event residing at the top of the tree. Using the jet fighter example to illustrate the operation of a fault model, at the top of the fault model 500 is the observed event or anomaly, which in the example of the jet fighter can be an aircraft stall 502. The branches of the tree emanating from the observed anomaly or event can be the possible causes of the event. In the jet fighter example, the aircraft stall 502 could be caused by loss of aileron control 504, pilot error 506, or other causes not pictured in the diagram of FIG. 5.

Emanating from the possible causes of the stall 502 (i.e., loss of aileron control 504 or pilot error 506) are the possible causes of the stall. For instance, emanating from loss of aileron control 504 are two possible causes: loss of sensor data 508 and malfunction in pilot control 510. In other words, according to the fault model 500, when aileron control is lost, there can be two causes: loss of sensor data or malfunction of the pilot controls. The relationship between these causes can also be characterized by the fault tree. For instance, at 518 in FIG. 5, the relationship between the loss of sensor data 508 and malfunction in pilot control 510 can be characterized as an "or" relationship, meaning that either cause can cause the loss of aileron control. In another example, multiple causes of pilot error 506 (i.e., 512 and 514) can be characterized as having an "and" relationship 520, which can mean that both events have to occur for pilot error to occur.

Returning to FIG. 3, at step 310 the attack packs can be derived from fault models such as the fault model discussed with respect to FIG. 5. In other words, attack packs can be derived from the fault models of the CPS under analysis. An attack pack can refer to a collection of steps that can be taken to attack or "hack" a cyber system and consists of carefully selecting a set of "attack hooks" and their execution sequence. Fault models can be used to determine what attack packs can be used to create one or more faults in the CPS. As part of a conventional design process of a CPS, fault models can be generated so as to efficiently illustrate the possible causes of a system failure or anomaly. A single CPS may have numerous fault models associated with it. A fault model can take an anomaly or event in the operation of a CPS and map the possible causes for such an event or anomaly.

Figure 6:
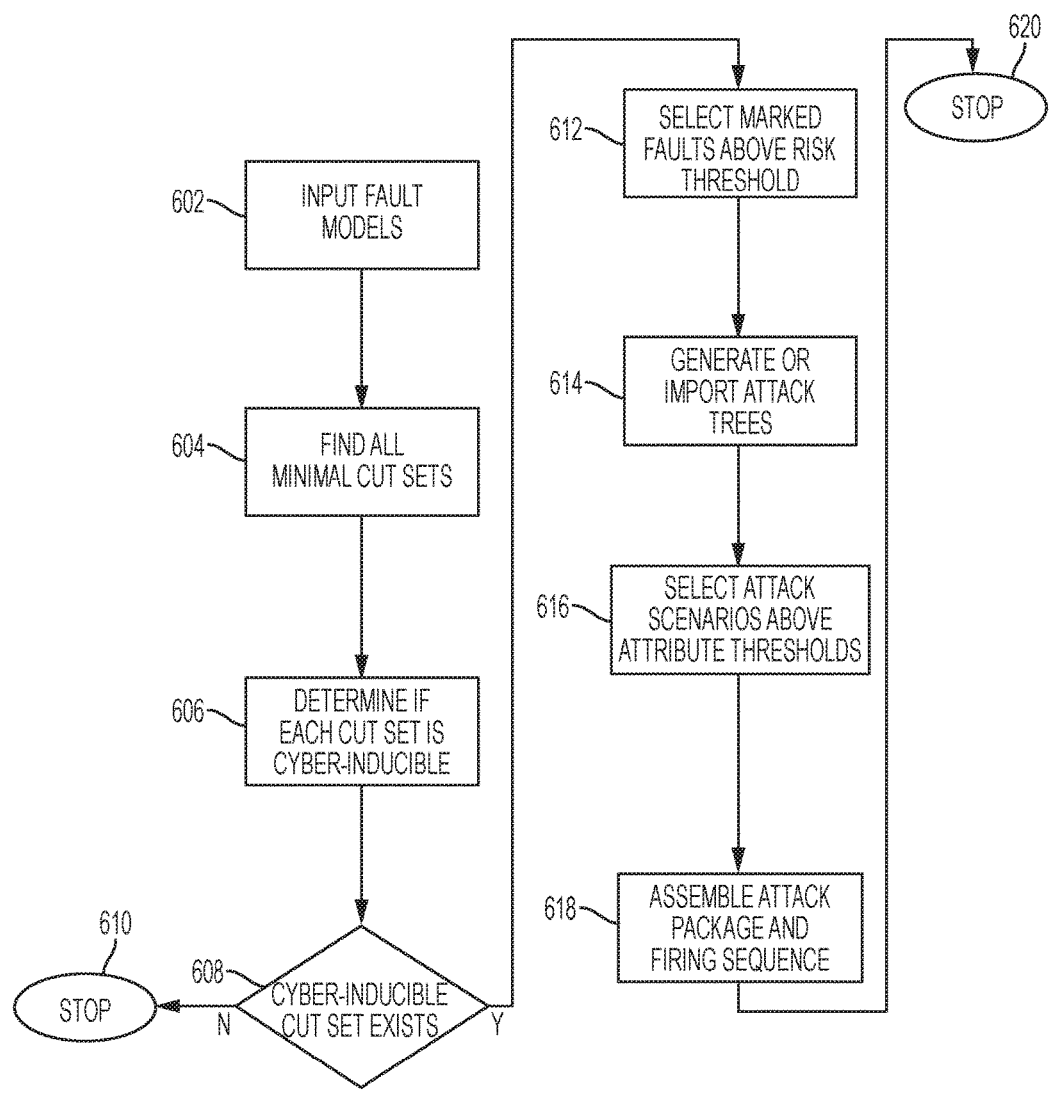
FIG. 6 illustrates an exemplary method for deriving attack packs from fault models according to examples of the disclosure.

FIG. 6 illustrates an exemplary method for deriving attack packs from fault models according to examples of the disclosure. At step 602, the fault models can be inputted by the computing system implementing the CPS simulation. As previously discussed, the fault models can be generated during the design process of a CPS. There can be many types of fault models that address numerous varieties of anomalies and faults that can occur to a CPS. Therefore, in order to promote more efficient processing of the fault models, the number of fault models inputted by the system can be winnowed down by taking into account the experiment scope, which was specified at step 302 of FIG. 3. Using the fighter jet example, if at step 302 the scope of the experiment is defined as determining cyber events that can cause loss of aileron control, then fault models associated with loss of landing gear or other jet components would not need to be considered since they fall outside the scope of the experiment defined at step 302.

Returning to FIG. 6, once the pertinent fault models are inputted, the process can move to step 604 wherein the minimal cut sets of the fault models can be determined. A minimal cut set can refer to the minimum number of events that are needed to occur for a particular anomaly or event to be observed. In the example of the jet fighter, a minimal cut set can be determined for an engine stall. In other words, the minimum number of events that have to occur in order to generate a stall are determined. In the example of FIG. 5, for an aircraft stall 502, one minimal cut set could be the loss of aileron control 504, which could occur if there is a loss of sensor data 508.

Once the minimal cut sets are determined, the analysis moves to step 606 wherein each identified cut set is further analyzed to determine if the cut set is cyber inducible. Returning to the jet fighter example, as illustrated in FIG. 5, there can be multiple causes for an aircraft stall 502. One cause can be the loss of sensor data 508, which can cause loss of aileron control 504; another could be pilot error 506. A pilot error 506 would not be cyber inducible since a pilot's actions are not controlled by a cyber system. However, a loss of sensor data 508 could be cyber inducible since the sensor data can be relayed through cyber elements within a CPS. Thus, at step 606, each cut set is analyzed to determine which ones are cyber inducible and which ones are non-cyber inducible. In this way, only the cyber inducible cut sets and constituent faults would require further analysis from a CPS simulation as described in FIG. 3.

At step 608, if there are no cyber inducible cut sets found, then the process can terminate at step 610, and the need for further simulation may also be unnecessary. However, if one or more cyber inducible cut sets are found, the process can move to step 612 wherein the cyber inducible cuts sets are further analyzed to determine if the likelihood of the cyber inducible fault is above a pre-determined risk threshold that is of interest to the security analyst (i.e. the user of the invention)

A risk threshold is a product of the probability/likelihood of the fault and the consequent impact (damage) Using the jet example of FIG. 6, if a cyberattack can cause a loss of sensor data 508, the risk threshold can refer to the probability that a loss of sensor data will actually cause a loss of aileron control. If the probability is low that a loss of sensor data 508 will cause a loss of aileron control, then running a simulation on such a scenario might not be required. The risk threshold of each cyber-inducible cut set can be determined and compared against a pre-determined value. If the risk threshold is lower than the pre-determined value, then the particular cut set may be excluded from further analysis. If, however, the risk threshold is higher than the pre-determined value, then the cut set can be selected for further processing.

Once the cut sets that have been identified as having a risk threshold above a pre-determined value are selected, the process can move to step 614 wherein attack trees can be imported or generated. Attack trees can represent methods of "hacking" a system so as to induce a cyber event of interest. Returning to the jet fighter scenario, if the cyber-inducible event is defined as a loss of sensor data, then one or more attack trees can be generated or imported at step 614, each attack tree can represent a method of attacking the cyber elements of the CPS so as to induce a loss of sensor data.

Once the pertinent attack trees have been generated or imported at step 614, the process can move to step 616 wherein the attack scenarios that are determined to be above a pre-determined attribute threshold are selected. An attribute threshold can refer to the probability that a particular attack scenario can be executed. As an example, if a cyber-attack is easily orchestrated by a malicious hacker using minimal computing resources, then there is a higher probability that the attack scenario can be executed. If, however, a particular attack requires a large amount of computing resources that may not be generally available to a common user or even state-sponsored hackers, then there is a low probability that the attack scenario can be executed. At step 616, each imported attack tree/scenario can be analyzed to determine a probability of execution, and the determined probability can be compared against a pre-determined attribute threshold. If the probability is lower than the pre-determined attribute threshold, then the attack scenario maybe excluded from further analysis. If, however, the probability of execution is higher than the pre-determined threshold, then the attack scenario can be selected for further processing.

Once the attack scenarios have been selected at step 616, the process can move to step 618 wherein each selected attack scenario is assembled and a firing sequence is determined. An attack scenario is enacted through a combination of carefully selected attack hooks. At step 618, each selected attack scenario can be converted into a series of steps to be taken on a cyber simulation, such as that discussed with respect to FIG. 1. The firing sequence can refer to the order in which the steps are executed. Thus, at step 618, the implementation of each selected attack scenario can be determined for execution on the cyber simulation model. Finally, at step 620, the process of deriving attack packs from fault models can be terminated.

Returning to FIG. 3, once the attack packs have been derived at step 310, the process can move to step 312 wherein attack hooks are generated, selected, and placed into the control system model. At step 310, the attack packs for launching a cyberattack against a cyber system are determined. Step 310 can include the process of determining how the control system model (i.e., as exemplified by FIG. 2) is affected by the cyberattack identified in step 308. As mentioned before, an attack hook refers to simulation components or "blocks" that can be inserted into a control system simulation and be used to mimic the attack effect on a control system based on an anomaly or event occurring in the cyber system. The generation of and placement of attack hooks is based on the cyber to control mapping carried out in step 306 and the derivation of attack packs as carried out in step 310. Recall that the assembly of attack packs is described fully FIG. 6.

Returning to the jet fighter example, if at step 310 an attack pack is selected such that the cyber system model (described with respect to FIG. 1) is hacked so as to make the jet pitch rate sensor data 104 unavailable to the computer 118, then at step 310 the cyber to control mapping performed at step 306 can be used to determine how the corresponding control system model (i.e., the control system model described with respect to FIG. 2) will be affected. In determining how the control system will be affected, the method can generate one or more attack hooks that can represent the corresponding control system phenomena that may take place if the system is hacked using the attack scenario generated in step 310.

Figure 7:
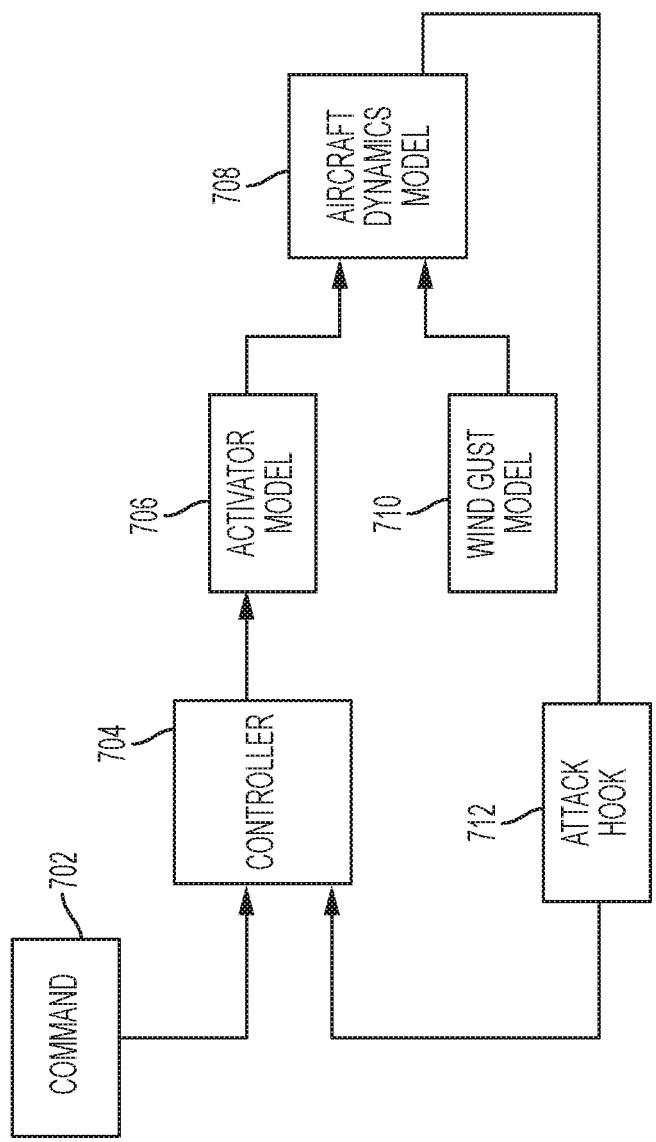
FIG. 7 illustrates an exemplary control system model with an attack hook according to examples of the disclosure.

FIG. 7 illustrates an exemplary control system model with an attack hook according to examples of the disclosure. The control system model 700 is substantially similar to the control system model 200 presented with respect to FIG. 2; thus, a discussion of components 702, 704, 706, 708, and 710 can be found in the corresponding discussion of components 202, 204, 206, 208, and 210 of FIG. 2. Based on the cyber to control system mapping that occurred at step 306, at step 310 the system can determine that an attack hook 712 can correspond to a loss of the jet pitch rate sensor 104 in the cyber simulation model 100 of FIG. 1. The attack hook 712 can either completely block the feedback loop between the aircraft dynamics model 708 and the controller 704, or it can delay the signal.

Once the attack hook has been generated, a user of the CPS simulation can select the hook and place it in the appropriate location with the control system model so as to mimic the effect on the control system engendered by a cyberattack. Once the attack hooks have been selected and placed, the control simulation can be ready for operation so as to provide a modelling of the effects upon the control system that is resultant from a particular cyberattack.

Once the hooks have been selected and placed at step 312, the process can move to step 314 wherein the run configuration of the control system simulation can be specified. In a control system that contains multiple attack hooks, specifying the run configurations can include specifying which combinations of attack hooks will be active in a particular simulation run. As an example, in one run configuration, all of the identified and placed attack hooks can be operated. However, in another run configuration, only a subset of the attack hooks may be operated during a given simulation run.

Upon execution of the experiment at step 316, the process can move to step 318 wherein the initial analysis and visualization of run results is provided by the simulation. The analysis and visualization run results that are provided can be based on the specification of the events and signals of interest provided by the user at step 308.

After the user is provided with the initial analysis and visualization or run results at step 318, the user of the simulation can specify whether it wants to run any deeper analysis or further risk assessment. For instance, if during the simulation run an anomaly or event occurs, the user can run a deeper analysis to determine in what configuration the anomaly occurred, which attack hooks caused the anomaly, and which cyberattack generated the attack hook that caused the anomaly.

At step 322, the user can be offered the option to revise the simulation. Revising the simulation can include altering the attack hooks and/or revising the simulation models. If the user does not wish to revise the simulation, then the process can move to step 330 wherein the simulation is terminated. If, however, the user indicates a wish to revise the simulation, the process can move to step 324 wherein the user can indicate if it wishes to revise the simulation models itself.

If the user indicates a wish to revise the simulation experiments at step 322 the process proceeds to step 324 where the type of revision is indicated. The user in step 324 has to now indicate whether it (he/she) wishes to revise the AADL and simulation models themselves as these revisions represent fundamental design changes to the control system of the CPS. If not, the process can return to step 310 wherein the user can modify the selection and placement of attack hooks. In this way, the user is given an opportunity to initiate new simulations without having to revise the simulation models themselves. If, however, at step 324 the user indicates that it wishes to revise the models, the process can move to step 326 wherein the user can add mitigations to the simulation models. Mitigations can refer to one or more changes to the hardware and software architecture of the system as embodied in its AADL model, and the resultant revised mappings to the simulation models so as to help to remedy anomalies or events that were seen during the previous simulation.

The mitigations added at step 326 can, along with the current simulation models, be used to generate new models at step 328. Based on the mitigations added by the user at step 326, new cyber simulation models and control system models can be built. Once the new models have been built at step 328, the process can revert back to step 304 wherein the newly built models are imported and the process of mapping the cyber simulation models to the control system models and generating attack hooks can be started again.

Figure 8:
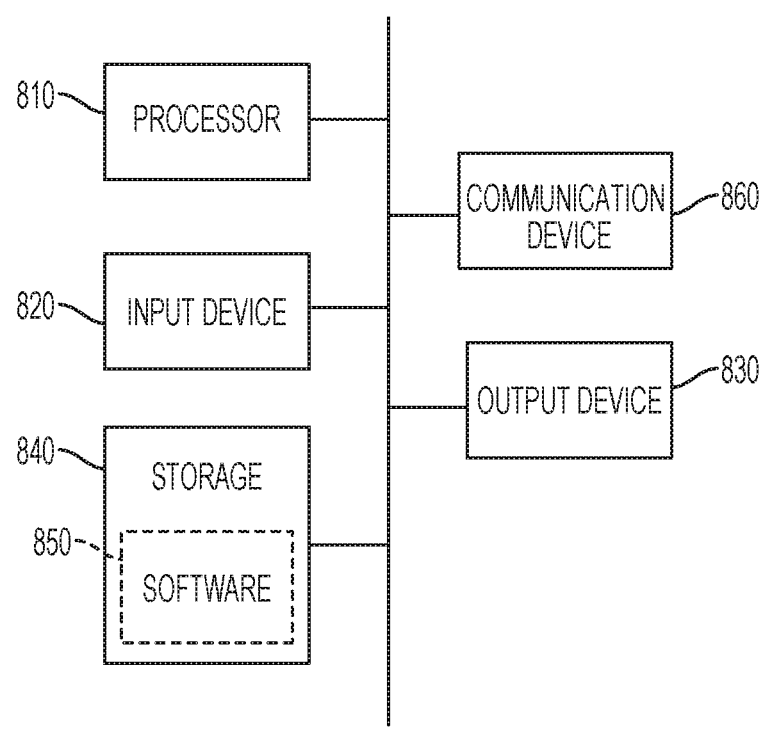
FIG. 8 illustrates an example of a computing device in accordance with one embodiment.

FIG. 8 illustrates an example of a computing device in accordance with one embodiment. Device 800 can be a host computer connected to a network. Device 800 can be a client computer or a server. As shown in FIG. 8, device 800 can be any suitable type of microprocessor-based device, including a personal computer, work station, server, or handheld computing device (portable electronic device), such as a phone or tablet. The device can include, for example, one or more of processor 810, input device 820, output device 830, storage 840, and communication device 860. Input device 820 and output device 830 can generally correspond to those described above and can either be connectable or integrated with the computer.

Input device 820 can be any suitable device that provides input, such as a touch screen, keyboard or keypad, mouse, or voice-recognition device. Output device 830 can be any suitable device that provides output, such as a touch screen, haptics device, or speaker.

Storage 840 can be any suitable device that provides storage, such as an electrical, magnetic, or optical memory including a RAM, cache, hard drive, or removable storage disk. Communication device 960 can include any suitable device capable of transmitting and receiving signals over a network, such as a network interface chip or device. The components of the computer can be connected in any suitable manner, such as via a physical bus or wirelessly.

Software 850, which can be stored in storage 840 and executed by processor 810, can include, for example, the programming that embodies the functionality of the present disclosure (e.g., as embodied in the devices as described above).

Software 850 can also be stored and/or transported within any non-transitory computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

Device 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Device 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a web browser as a web-based application or web service, for example.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Therefore, according to the above, some examples of the disclosure are directed to a method for simulating a cyber-control system, the method comprising: receiving a definition of a scope of a simulation, generating a mapping of a cyber simulation model to a control system simulation model, selecting one or more fault models, wherein the selected fault models are based on the received definition of the scope of the simulation, generating one or more attack plans for the cyber simulation model, wherein the one or more attack plans are based on the selected one or more fault models, generating one or more attack hooks for the control system simulation model, wherein the one or more attack hooks are based on the generated mapping of the cyber simulation model to the control system model and based on the generated one or more attack packs for the cyber simulation model, modifying the control system simulation model to include the one or more generated attack hooks, and executing a simulation on the modified control system simulation model. Additionally or alternatively to one or more of the examples disclosed above, in some examples, generating a mapping of the cyber simulation model to the control system model comprises: generating one or more versions of the cyber simulation model, wherein a plurality of the versions of the cyber simulation model are based on a different description of the cyber simulation model, and generating one or more versions of the control system simulation model, wherein each version of the control system simulation model is based on a different abstraction of the control system simulation model. Additionally or alternatively to one or more of the examples disclosed above, in some examples, generating a mapping of the cyber simulation model to the control system model further comprises: comparing the generated one or more versions of the cyber simulation model with the one or more versions of the control system simulation model, and determining a most probable mapping between the one or more versions of the cyber simulation model and the one or more versions of the control system simulation model, wherein the determination is based on the comparison between the generated one or more versions of the cyber simulation model and the one or more versions of the control system simulation model. Additionally or alternatively to one or more of the examples disclosed above, in some examples, comparing the generated one or more versions of the cyber simulation model with the one or more versions of the control system simulation model includes determining one or more lexical similarities between the generated one or more versions of the cyber simulation model and the one or more versions of the control system simulation model. Additionally or alternatively to one or more of the examples disclosed above, in some examples, comparing the generated one or more versions of the cyber simulation model with the one or more versions of the control system simulation model includes determining one or more behavioral similarities between the generated one or more versions of the cyber simulation model and the one or more versions of the control system simulation model. Additionally or alternatively to one or more of the examples disclosed above, in some examples, comparing the generated one or more versions of the cyber simulation model with the one or more versions of the control system simulation model includes determining one or more structural similarities between the generated one or more versions of the cyber simulation model and the one or more versions of the control system simulation model. Additionally or alternatively to one or more of the examples disclosed above, in some examples, generating one or more attack plans for the cyber simulation model comprises: determining and selecting one or more minimal cut sets of the selected one or more fault models. Additionally or alternatively to one or more of the examples disclosed above, in some examples, generating one or more attack plans for the cyber simulation model further comprises: determining if each selected minimal cut set is cyber inducible, and generating the one or more attack plans for the cyber simulation model based on the one or more minimal cut sets determined to be cyber inducible. Additionally or alternatively to one or more of the examples disclosed above, in some examples, wherein generating one or more attack hooks for the control system simulation model comprises: observing one or more events on the cyber simulation model based on the generated attack plans; and determining a corresponding one or more events on control simulation model based on the observed one or more events on the cyber simulation model and the generated mapping of the cyber simulation model to the control system simulation model. Additionally or alternatively to one or more of the examples disclosed above, in some examples, modifying the control system simulation model to include one or more generated attack hooks includes inserting the attack hooks into the control system simulation model so as to mimic the effect of the one or more attack packs on the control system simulation model. Additionally or alternatively to one or more of the examples disclosed above, in some examples, executing a simulation of the modified control system simulation model comprises: selecting one or more run configurations of the control system simulation model, and executing a simulation on each of the one or more run configuration of the control system simulation model. Additionally or alternatively to one or more of the examples disclosed above, in some examples, the cyber simulation model is implemented using Architecture Analysis & Design Language (AADL). Additionally or alternatively to one or more of the examples disclosed above, in some examples, the control system simulation model is implemented using Simulink.

Some examples of the disclosure are directed to a non-transitory computer readable storage medium having stored thereon a set of instructions for simulating a cyber-control system that when executed by a computing device, cause the computing device to: receive a definition of a scope of a simulation, generate a mapping of a cyber simulation model to a control system simulation model, select one or more fault models, wherein the selected fault models are based on the received definition of the scope of the simulation, generate one or more attack plans for the cyber simulation model, wherein the one or more attack plans are based on the imported one or more fault models, generate one or more attack hooks for the control system simulation model, wherein the one or more attack hooks are based on the generated mapping of the cyber simulation model to the control system model and based on the generated one or more attack packs for the cyber simulation model, modify the control system simulation model to include the one or more generated attack hooks, and execute a simulation on the modified control system simulation model. Additionally or alternatively to one or more of the examples disclosed above, in some examples, generating a mapping of the cyber simulation model to the control system model comprises: generating one or more versions of the cyber simulation model, wherein a plurality of the versions of the cyber simulation model are based on a different description of the cyber simulation model, and generating one or more versions of the control system simulation model, wherein each version of the control system simulation model is based on a different abstraction of the control system simulation model. Additionally or alternatively to one or more of the examples disclosed above, in some examples, comparing the generated one or more versions of the cyber simulation model with the one or more versions of the control system simulation model includes determining one or more structural similarities between the generated one or more versions of the cyber simulation model and the one or more versions of the control system simulation model. Additionally or alternatively to one or more of the examples disclosed above, in some examples, generating one or more attack plans for the cyber simulation model comprises: determining and selecting one or more minimal cut sets of the selected one or more fault models. Additionally or alternatively to one or more of the examples disclosed above, in some examples, generating one or more attack plans for the cyber simulation model further comprises: determining if each selected minimal cut set is cyber inducible, and generating the one or more attack plans for the cyber simulation model based on the one or more minimal cut sets determined to be cyber inducible. Additionally or alternatively to one or more of the examples disclosed above, in some examples, wherein generating one or more attack hooks for the control system simulation model comprises: observing one or more events on the cyber simulation model based on the generated attack plans; and determining a corresponding one or more events on control simulation model based on the observed one or more events on the cyber simulation model and the generated mapping of the cyber simulation model to the control system simulation model. Additionally or alternatively to one or more of the examples disclosed above, in some examples, modifying the control system simulation model to include one or more generated attack hooks includes inserting the attack hooks into the control system simulation model so as to mimic the effect of the one or more attack packs on the control system simulation model. Additionally or alternatively to one or more of the examples disclosed above, in some examples, executing a simulation of the modified control system simulation model comprises: selecting one or more run configurations of the control system simulation model, and executing a simulation on each of the one or more run configuration of the control system simulation model. Additionally or alternatively to one or more of the examples disclosed above, in some examples, the cyber simulation model is implemented using Architecture Analysis & Design Language (AADL). Additionally or alternatively to one or more of the examples disclosed above, in some examples, the control system simulation model is implemented using Simulink.

Some examples of the disclosure are directed to a computing system comprising: one or more processors, the one or more processors configured to: receive a definition of a scope of a simulation, generate a mapping of a cyber simulation model to a control system simulation model, select one or more fault models, wherein the selected fault models are based on the received definition of the scope of the simulation, generate one or more attack plans for the cyber simulation model, wherein the one or more attack plans are based on the imported one or more fault models, generate one or more attack hooks for the control system simulation model, wherein the one or more attack hooks are based on the generated mapping of the cyber simulation model to the control system model and based on the generated one or more attack packs for the cyber simulation model, modify the control system simulation model to include the one or more generated attack hooks, and execute a simulation on the modified control system simulation model. Additionally or alternatively to one or more of the examples disclosed above, in some examples, generating a mapping of the cyber simulation model to the control system model comprises: generating one or more versions of the cyber simulation model, wherein a plurality of the versions of the cyber simulation model are based on a different description of the cyber simulation model, and generating one or more versions of the control system simulation model, wherein each version of the control system simulation model is based on a different abstraction of the control system simulation model. Additionally or alternatively to one or more of the examples disclosed above, in some examples, comparing the generated one or more versions of the cyber simulation model with the one or more versions of the control system simulation model includes determining one or more structural similarities between the generated one or more versions of the cyber simulation model and the one or more versions of the control system simulation model. Additionally or alternatively to one or more of the examples disclosed above, in some examples, generating one or more attack plans for the cyber simulation model comprises: determining and selecting one or more minimal cut sets of the selected one or more fault models. Additionally or alternatively to one or more of the examples disclosed above, in some examples, generating one or more attack plans for the cyber simulation model further comprises: determining if each selected minimal cut set is cyber inducible, and generating the one or more attack plans for the cyber simulation model based on the one or more minimal cut sets determined to be cyber inducible. Additionally or alternatively to one or more of the examples disclosed above, in some examples, wherein generating one or more attack hooks for the control system simulation model comprises: observing one or more events on the cyber simulation model based on the generated attack plans; and determining a corresponding one or more events on control simulation model based on the observed one or more events on the cyber simulation model and the generated mapping of the cyber simulation model to the control system simulation model. Additionally or alternatively to one or more of the examples disclosed above, in some examples, modifying the control system simulation model to include one or more generated attack hooks includes inserting the attack hooks into the control system simulation model so as to mimic the effect of the one or more attack packs on the control system simulation model. Additionally or alternatively to one or more of the examples disclosed above, in some examples, executing a simulation of the modified control system simulation model comprises: selecting one or more run configurations of the control system simulation model, and executing a simulation on each of the one or more run configuration of the control system simulation model. Additionally or alternatively to one or more of the examples disclosed above, in some examples, the cyber simulation model is implemented using Architecture Analysis & Design Language (AADL). Additionally or alternatively to one or more of the examples disclosed above, in some examples, the control system simulation model is implemented using Simulink.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

What is claimed is:

1. A method for simulating a cyber-physical system, wherein the method is performed at one or more hardware processors configured to execute one or more programs stored in a memory of a computing system, the method comprising:
   receiving a definition of a scope of a simulation;
   generating a mapping of a cyber simulation model to a control system simulation model,
      wherein the cyber simulation model is configured to model a software and hardware architecture of the cyber-physical system; and
      wherein the control system simulation model is configured to model a physical behavior of the cyber-physical system;
   selecting one or more fault models, wherein the selected fault models are based on the received definition of the scope of the simulation;
   generating one or more attack plans for the cyber simulation model, wherein the one or more attack plans are based on the selected one or more fault models;
   generating one or more attack hooks for the control system simulation model, wherein the one or more attack hooks are based on the generated mapping of the cyber simulation model to the control system model and based on the generated one or more attack packs for the cyber simulation model;
   modifying the control system simulation model to include the one or more generated attack hooks; and
   executing a simulation on the modified control system simulation model.

2. The method of claim 1, wherein generating a mapping of the cyber simulation model to the control system model comprises:
   generating one or more versions of the cyber simulation model, wherein a plurality of the versions of the cyber simulation model are based on a different description of the cyber simulation model; and
   generating one or more versions of the control system simulation model, wherein each version of the control system simulation model is based on a different abstraction of the control system simulation model.

3. The method of claim 2, wherein generating a mapping of the cyber simulation model to the control system model further comprises:

comparing the generated one or more versions of the cyber simulation model with the one or more versions of the control system simulation model; and determining a most probable mapping between the one or more versions of the cyber simulation model and the one or more versions of the control system simulation model, wherein the determination is based on the comparison between the generated one or more versions of the cyber simulation model and the one or more versions of the control system simulation model.

4. The method of claim 3, wherein comparing the generated one or more versions of the cyber simulation model with the one or more versions of the control system simulation model includes determining one or more lexical similarities between the generated one or more versions of the cyber simulation model and the one or more versions of the control system simulation model.

5. The method of claim 3, wherein comparing the generated one or more versions of the cyber simulation model with the one or more versions of the control system simulation model includes determining one or more behavioral similarities between the generated one or more versions of the cyber simulation model and the one or more versions of the control system simulation model.

6. The method of claim 3, wherein comparing the generated one or more versions of the cyber simulation model with the one or more versions of the control system simulation model includes determining one or more structural similarities between the generated one or more versions of the cyber simulation model and the one or more versions of the control system simulation model.

7. The method of claim 1, wherein generating one or more attack plans for the cyber simulation model comprises:
determining and selecting one or more minimal cut sets of the selected one or more fault models.

8. The method of claim 7, wherein generating one or more attack plans for the cyber simulation model further comprises:
determining if each selected minimal cut set is cyber inducible; and
generating the one or more attack plans for the cyber simulation model based on the one or more minimal cut sets determined to be cyber inducible.

9. The method of claim 1, wherein generating one or more attack hooks for the control system simulation model comprises:
observing one or more events on the cyber simulation model based on the generated attack plans; and
determining a corresponding one or more events on the control simulation model based on the observed one or more events on the cyber simulation model and the generated mapping of the cyber simulation model to the control system simulation model.

10. The method of claim 1, wherein modifying the control system simulation model to include one or more generated attack hooks includes inserting the attack hooks into the control system simulation model so as to mimic the effect of the one or more attack packs on the control system simulation model.

11. The method of claim 1, wherein executing a simulation of the modified control system simulation model comprises:
selecting one or more run configurations of the control system simulation model; and
executing a simulation on each of the one or more run configurations of the control system simulation model.

12. The method of claim 1, wherein the cyber simulation model is implemented using Architecture Analysis & Design Language (AADL).

13. The method of claim 1, wherein the control system simulation model is implemented using Simulink.

14. A non-transitory computer readable storage medium having stored thereon a set of instructions for simulating a cyber-physical system that when executed by a computing device, cause the computing device to:
receive a definition of a scope of a simulation;
generate a mapping of a cyber simulation model to a control system simulation model;
wherein the cyber simulation model is configured to model a software and hardware architecture of the cyber-physical system; and
wherein the control system simulation model is configured to model a physical behavior of the cyber-physical system;
select one or more fault models, wherein the selected fault models are based on the received definition of the scope of the simulation;
generate one or more attack plans for the cyber simulation model, wherein the one or more attack plans are based on the imported one or more fault models;
generate one or more attack hooks for the control system simulation model, wherein the one or more attack hooks are based on the generated mapping of the cyber simulation model to the control system model and based on the generated one or more attack packs for the cyber simulation model;
modify the control system simulation model to include the one or more generated attack hooks; and
execute a simulation on the modified control system simulation model.

15. The non-transitory computer readable storage medium of claim 14, wherein generating a mapping of the cyber simulation model to the control system model comprises:
generating one or more versions of the cyber simulation model, wherein a plurality of the versions of the cyber simulation model are based on a different description of the cyber simulation model; and
generating one or more versions of the control system simulation model, wherein each version of the control system simulation model is based on a different abstraction of the control system simulation model.

16. The non-transitory computer readable storage medium of claim 15, wherein generating a mapping of the cyber simulation model to the control system model further comprises:
comparing the generated one or more versions of the cyber simulation model with the one or more versions of the control system simulation model; and
determining a most probable mapping between the one or more versions of the cyber simulation model and the one or more versions of the control system simulation model, wherein the determination is based on the comparison between the generated one or more versions of the cyber simulation model and the one or more versions of the control system simulation model.

17. The non-transitory computer readable storage medium of claim 16, wherein comparing the generated one or more versions of the cyber simulation model with the one or more versions of the control system simulation model includes determining one or more lexical similarities between the generated one or more versions of the cyber simulation model and the one or more versions of the control system simulation model.

18. The non-transitory computer readable storage medium of claim 16, wherein comparing the generated one or more versions of the cyber simulation model with the one or more versions of the control system simulation model includes determining one or more behavioral similarities between the generated one or more versions of the cyber simulation model and the one or more versions of the control system simulation model.

19. The non-transitory computer readable storage medium of claim 16, wherein comparing the generated one or more versions of the cyber simulation model with the one or more versions of the control system simulation model includes determining one or more structural similarities between the generated one or more versions of the cyber simulation model and the one or more versions of the control system simulation model.

20. The non-transitory computer readable storage medium of claim 14, wherein generating one or more attack plans for the cyber simulation model comprises:
  determining and selecting one or more minimal cut sets of the selected one or more fault models.

21. The non-transitory computer readable storage medium of claim 20, wherein generating one or more attack plans for the cyber simulation model further comprises:
  determining if each selected minimal cut set is cyber inducible; and
  generating the one or more attack plans for the cyber simulation model based on the one or more minimal cut sets determined to be cyber inducible.

22. The non-transitory computer readable storage medium of claim 14, wherein generating one or more attack hooks for the control system simulation model comprises:
  observing one or more events on the cyber simulation model based on the generated attack plans; and
  determining a corresponding one or more events on control simulation model based on the observed one or more events on the cyber simulation model and the generated mapping of the cyber simulation model to the control system simulation model.

23. The non-transitory computer readable storage medium of claim 14, wherein modifying the control system simulation model to include one or more generated attack hooks includes inserting the attack hooks into the control system simulation model so as to mimic the effect of the one or more attack packs on the control system simulation model.

24. The non-transitory computer readable storage medium of claim 14, wherein executing a simulation of the modified control system simulation model comprises:
  selecting one or more run configurations of the control system simulation model; and
  executing a simulation on each of the one or more run configuration of the control system simulation model.

25. The non-transitory computer readable storage medium of claim 14, wherein the cyber simulation model is implemented using Architecture Analysis & Design Language (AADL).

26. The non-transitory computer readable storage medium of claim 14, wherein the control system simulation model is implemented using Simulink.

27. A computing system comprising:
  a memory;
  one or more hardware processors; and
  one or more programs configured to simulate a cyber-physical system, wherein the one or more programs are stored in the memory and configured to be executed by the one or more hardware processors, the one or more programs when executed by the one or more hardware processors cause the hardware processor to:
  receive a definition of a scope of a simulation;
  generate a mapping of a cyber simulation model to a control system simulation model;
    wherein the cyber simulation model is configured to model a software and hardware architecture of the cyber-physical system; and
    wherein the control system simulation model is configured to model a physical behavior of the cyber-physical system;
  select one or more fault models, wherein the selected fault models are based on the received definition of the scope of the simulation;
  generate one or more attack plans for the cyber simulation model, wherein the one or more attack plans are based on the imported one or more fault models;
  generate one or more attack hooks for the control system simulation model, wherein the one or more attack hooks are based on the generated mapping of the cyber simulation model to the control system model and based on the generated one or more attack packs for the cyber simulation model;
  modify the control system simulation model to include the one or more generated attack hooks; and
  execute a simulation on the modified control system simulation model.

28. The computing system of claim 27, wherein generating a mapping of the cyber simulation model to the control system model comprises:
  generating one or more versions of the cyber simulation model, wherein a plurality of the versions of the cyber simulation model are based on a different description of the cyber simulation model; and
  generating one or more versions of the control system simulation model, wherein each version of the control system simulation model is based on a different abstraction of the control system simulation model.

29. The computing system of claim 28, wherein generating a mapping of the cyber simulation model to the control system model further comprises:
  comparing the generated one or more versions of the cyber simulation model with the one or more versions of the control system simulation model; and
  determining a most probable mapping between the one or more versions of the cyber simulation model and the one or more versions of the control system simulation model, wherein the determination is based on the comparison between the generated one or more versions of the cyber simulation model and the one or more versions of the control system simulation model.

30. The computing system of claim 29, wherein comparing the generated one or more versions of the cyber simulation model with the one or more versions of the control system simulation model includes determining one or more lexical similarities between the generated one or more versions of the cyber simulation model and the one or more versions of the control system simulation model.

31. The computing system of claim 29, wherein comparing the generated one or more versions of the cyber simulation model with the one or more versions of the control system simulation model includes determining one or more behavioral similarities between the generated one or more versions of the cyber simulation model and the one or more versions of the control system simulation model.

32. The computing system of claim 29, wherein comparing the generated one or more versions of the cyber simulation model with the one or more versions of the control system simulation model includes determining one or more structural similarities between the generated one or more versions of the cyber simulation model and the one or more versions of the control system simulation model.

33. The computing system of claim 27, wherein generating one or more attack plans for the cyber simulation model comprises:
   determining and selecting one or more minimal cut sets of the selected one or more fault models.

34. The computing system of claim 33, wherein generating one or more attack plans for the cyber simulation model further comprises:
   determining if each selected minimal cut set is cyber inducible; and
   generating the one or more attack plans for the cyber simulation model based on the one or more minimal cut sets determined to be cyber inducible.

35. The computing system of claim 27, wherein generating one or more attack hooks for the control system simulation model comprises:
   observing one or more events on the cyber simulation model based on the generated attack plans; and
   determining a corresponding one or more events on control simulation model based on the observed one or more events on the cyber simulation model and the generated mapping of the cyber simulation model to the control system simulation model.

36. The computing system of claim 27, wherein modifying the control system simulation model to include one or more generated attack hooks includes inserting the attack hooks into the control system simulation model so as to mimic the effect of the one or more attack packs on the control system simulation model.

37. The computing system of claim 27, wherein executing a simulation of the modified control system simulation model comprises:
   selecting one or more run configurations of the control system simulation model; and
   executing a simulation on each of the one or more run configuration of the control system simulation model.

38. The computing system of claim 27, wherein the cyber simulation model is implemented using Architecture Analysis & Design Language (AADL).

39. The computing system of claim 27, wherein the control system simulation model is implemented using Simulink.

40. The computing system of claim 27, wherein the one or more processors are further configured to determine one or more system vulnerabilities based on the executed simulation run.

* * * * *